A. KIPNISS AND M. P. NEUMANN.
MACHINE FOR MAKING BOBBINS FOR ELECTRIC BATTERIES.
APPLICATION FILED JAN. 10, 1918.

1,321,830.

Patented Nov. 18, 1919.
6 SHEETS—SHEET 1.

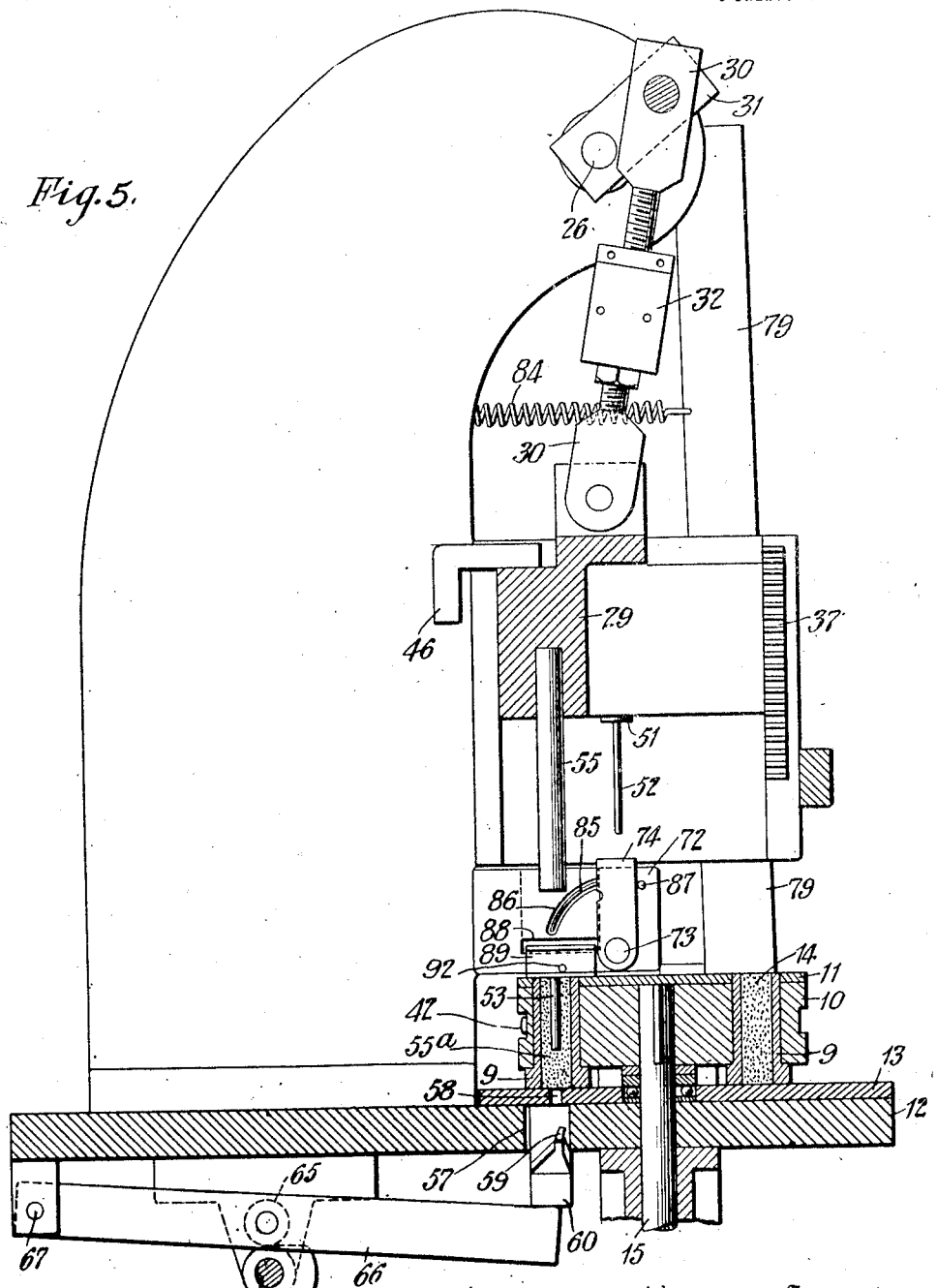

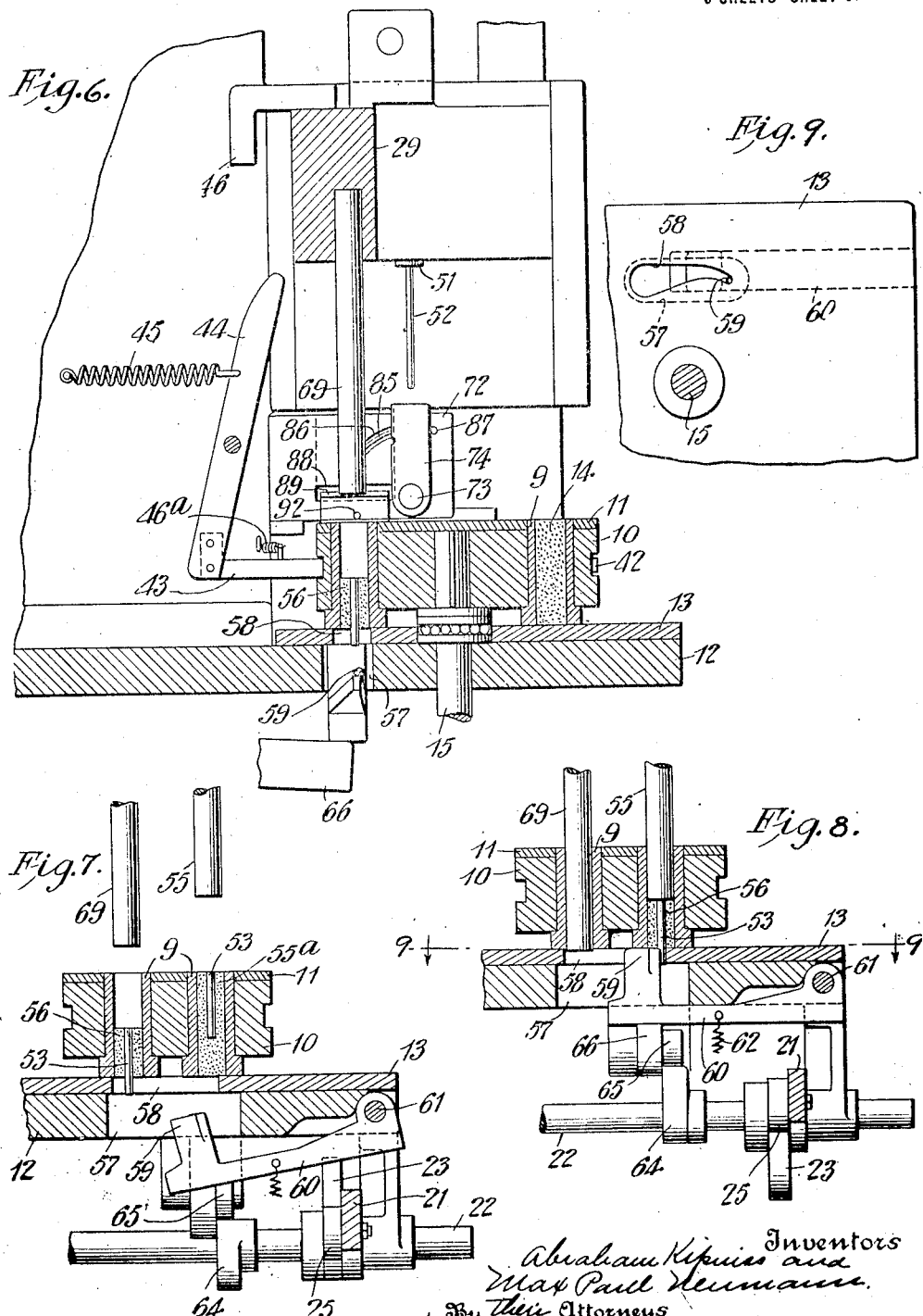

UNITED STATES PATENT OFFICE.

ABRAHAM KIPNISS AND MAX PAUL NEUMANN, OF NEW YORK, N. Y., ASSIGNORS TO NATIONAL CARBON COMPANY, INC., OF NEW YORK, N. Y., A CORPORATION OF NEW YORK.

MACHINE FOR MAKING BOBBINS FOR ELECTRIC BATTERIES.

1,321,830.     Specification of Letters Patent.     Patented Nov. 18, 1919.

Application filed January 10, 1918. Serial No. 211,173.

*To all whom it may concern:*

Be it known that we, ABRAHAM KIPNISS and MAX PAUL NEUMANN, citizens of the United States, residing in the borough of Queens, in the county of Queens and State of New York, have invented certain new and useful Improvements in Machines for Making Bobbins for Electric Batteries, of which the following is a specification, reference being had therein to the accompanying drawings, forming part thereof.

Our invention relates to machines for automatically making the inner electrodes or bobbins of usual dry batteries. Such an electrode or bobbin commonly includes a cylindrically shaped mass of depolarizing material which surrounds a central electrode rod of carbon which projects therefrom at one end thereof. The machine of our present invention is a further development of and improvement upon that disclosed in our copending application for patent, Serial No. 194,174, filed October 1, 1917, for machines for making bobbins for electric batteries, and also upon that disclosed in our copending application for patent, Serial No. 211,172, filed on even date herewith.

Objects of our present invention are to simplify the construction and increase the effectiveness of the machine, and also to improve the quality and uniformity of the bobbins produced thereby. Other objects and advantages of our invention will hereinafter appear.

In our first above noted earlier machine the carbon electrode rod was pushed into a perforated cylinder of depolarizing material in a mold, and was pushed against a solid or imperforate base plate or bottom-forming backing plate, thereby requiring, as there provided, resilient yielding means for pushing this carbon rod into place because of the brittle and friable nature of this rod and also introducing uncertainty as to the extent to which the carbon electrode rod would be pushed into the cylindrical perforated charge of depolarizing material, thereby causing irregularity in the length of the completed bobbins, particularly in view of the fact that the carbon electrode rods, although supposed to be all of the same length, as a matter of fact are not so. In both of our two other above noted machines, a hole was punched in the charge of depolarizing material for the reception of the carbon electrode rod. As a feature of our present invention and in clear differentiation from both of our other above noted inventions means are provided for inserting the carbon electrode rod into the mold and as a punch into the charge of depolarizing material therein at one end thereof without any hole or perforation having been previously formed therein, and for forcing or pushing this carbon electrode rod completely through the mold and through the charge of depolarizing material contained therein until such rod projects from the other or opposite end of the mold and of the charge of material contained therein, and until such rod is substantially flush with the end of the charge at which such rod was introduced, thereby effectively assuring that such electrode rod extends throughout the length of the cylindrical charge of depolarizing material, the carbon electrode rod being employed as a perforating punch for the comparatively loose material, and means being provided for firmly compressing and compacting the depolarizing material around the carbon electrode rod, thereby eliminating the means for initially compressing and punching a hole in the charge, such as were provided in both of our above noted machines, but retaining other features of these machines found desirable. Our invention also more particularly includes various features of construction and combinations of parts and sub-combinations thereof as will appear from the following description.

We shall now describe the automatic bobbin making machine embodying our invention illustrated in the accompanying drawings and shall thereafter point out our invention in claims.

Fig. 5 is a partial vertical section on planes indicated by the offset line 5—5 of Fig. 3 as viewed from the left.

Fig. 6 is a similar view on the offset line 6—6 as viewed from the left, and which in its middle part coincides with the line 5—5.

Fig. 7 is a partial vertical section on a plane indicated by the line 7—7 of Fig. 3 as viewed from below.

Fig. 8 is a view similar to Fig. 7 but with the movable parts in a different and succeeding position.

Fig. 9 is a partial transverse or horizontal section on a plane indicated by the horizontal line 9—9 of Fig. 8 as viewed from above.

Figure 1:
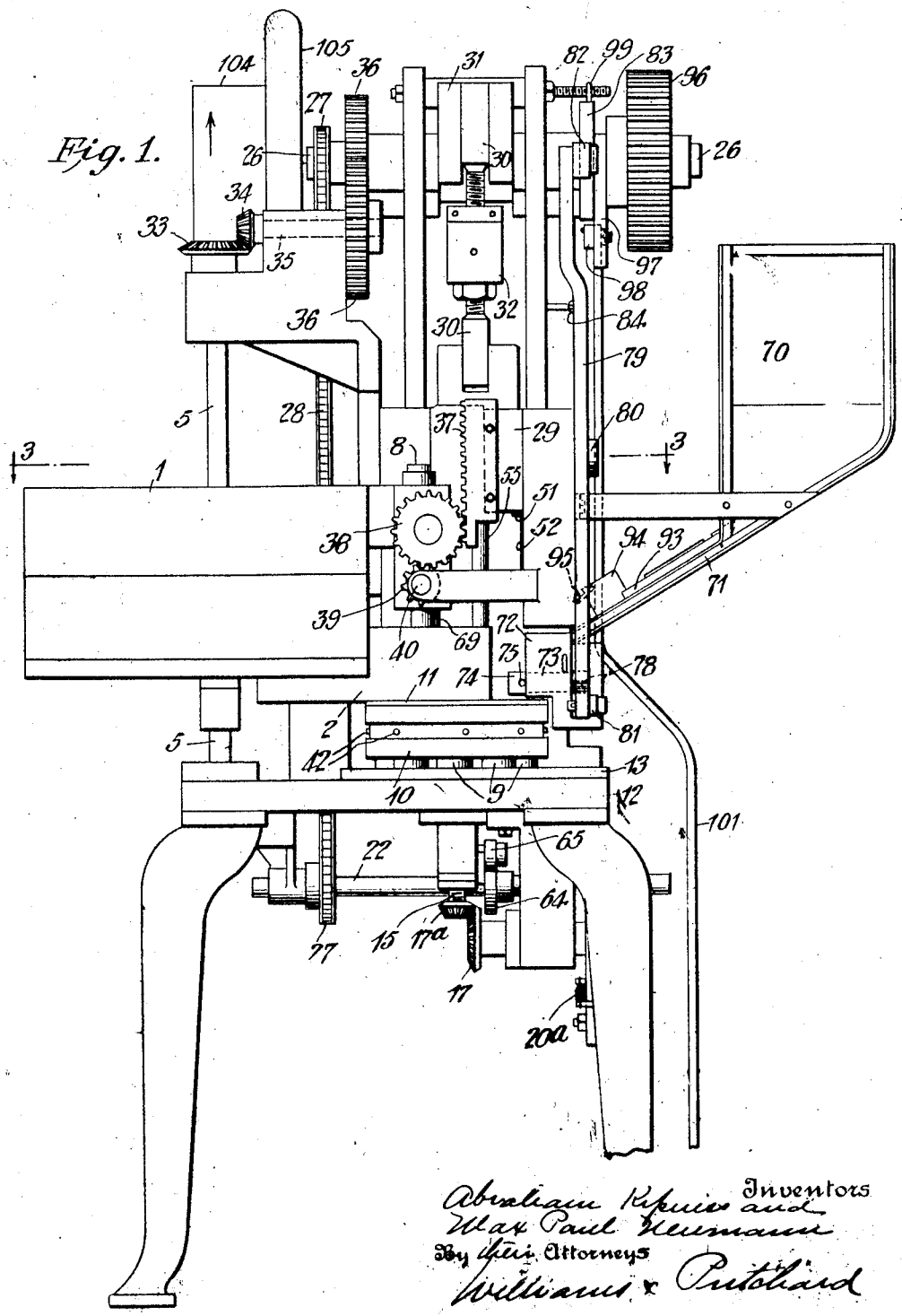
Figure 1 is a front elevation of an automatic bobbin making machine embodying our invention, the machine being shown with its parts in the position in which they normally come to rest when the machine is not in operation.

In the automatic electrode making or bobbin making machine embodying our invention illustrated in the accompanying drawings, the usually somewhat moist powdered depolarizing material is adapted to be contained in a main supply magazine 1 which in its lower part and at one side thereof freely communicates with a smaller auxiliary magazine or feed magazine 2. A rotating stirrer comprising wings or paddles 3 carried by a head 4 mounted upon a vertical rotating shaft 5 prevents packing of the fine moist depolarizing powder in the main magazine 1, and also assists its flow therefrom into the smaller feed magazine 2, as will be readily understood. A similar smaller stirrer in the feed magazine 2 has stirring blades 6 carried by a head 7 mounted upon a vertical operating shaft 8. Assisted by the stirrer blades 6 the powdered depolarizing material falls into the upper open ends of a series, shown as eight in number, of circularly arranged vertical molds 9 carried by a horizontally arranged rotating turret 10 shown as provided with an upper plate or face plate 11 which forms a bottom for the feed magazine 2 and upon which the powdered depolarizing material therein rests, and in the construction shown in the drawings the upper open ends of a plurality of an average of two of the molds 9 are in communication with the feed magazine 2, as appears most clearly in Fig. 3 of the drawings. The machine has a horizontally arranged bed plate 12 shown as provided on its upper side with a face plate 13 which closes the lower ends of and forms bottoms for the powder-receiving molds 9, as clearly appears in the drawings. By reason of gravity and the stirring blades 6, the molds 9 become evenly filled with loose depolarizing powder in the form of a cylinder 14, as appears in the drawings at the left in Fig. 4 and at the right in Figs. 5 and 6, more particularly. The turret 10 is fixed upon the upper end of a vertical operating shaft 15, shown as extending down through the bed plate 12 and as mounted in bearings carried thereby, these bearings for the turret shaft 15 including a weight-supporting thrust bearing shown as a ball bearing.

The mold-carrying turret 10 is automatically periodically rotated step by step or intermittently a distance equal to the space between the equidistantly spaced molds 9 by means now to be described. A short transverse or horizontal operating shaft 16 is journaled in the frame of the machine and at its inner end is connected to the turret shaft 15 to rotate the latter at double speed or at the rate of two-to-one by means of a bevel gear 17 on the operating shaft 16 which engages a bevel pinion $17^a$ on the turret shaft 15. At its outer end the turret-operating shaft 16 has fixed thereon a ratchet wheel 18 which has sixteen equidistantly spaced peripheral ratchet teeth corresponding to but double the number of the equidistantly spaced molds 9 of the turret 10. A vertically arranged rocking lever 19 is pivoted on the operating shaft 16 and at its lower end carries a spring-pressed pivoted pawl 20 which is pressed to the engaging position by a retractile spring $20^a$ and which engages the ratchet teeth of the ratchet wheel 18. At its upper end the rocking lever 19 has pivoted thereto one end of an operating link 21 which extends rearwardly and is shown as provided with a slot by which it is guided on a continuously rotating cam shaft 22 which is journaled in the lower part of the frame of the machine and extends parallel with the turret-operating shaft 16 at the rear thereof. The adjacent end of the cam shaft 22 carries a sector-shaped cam 23 which, as the cam shaft 22 rotates, engages a rear cam roller 24 on the rear end of the operating link 21 for thereby imparting rearward turret-rotating movement to the operating link 21, and which also engages another cam roller 25 on the operating link 21 for moving this link forward thereby to retract the turret-operating pawl 20 over one of the ratchet teeth of the ratchet wheel 18, the proportions and arrangements of the turret-operating cam 23 being such that the ratchet wheel 18 will be moved up one tooth and then have a period of rest for each rotation of the turret operating cam shaft 22 and whereby the mold-carrying turret 10 will have a corresponding movement of one-eighth of a rotation with a period of rest, as will be readily understood. During the operation of the machine the cam shaft 22 is continuously rotated from and at the same rate of speed as a main shaft or crank-shaft 26 which is journaled transversely in the upper part of the frame of the machine parallel with the cam shaft 22 and is connected thereto by means of a pair of similar sprocket wheels 27 and a sprocket chain 28.

A plunger-carrying cross-head 29 is vertically slidable in guideways provided in the frame of the machine, and during the operation of the machine is continuously reciprocated by means of a two-part connecting rod 30 and crank 31 on the main shaft 26, the connecting rod 30 being shown as adjustable as to its length by means of a turnbuckle 32 which forms a coupling between the two parts of this connecting rod. Before proceeding further it may be as well to note that the hereinbefore described stirrer in the main magazine 1 is continuously rotated during the operation of the machine by means of a bevel gear 33 fixed upon the upper end of the stirrer shaft 5 and engaged by a bevel pinion 34 carried by a short transverse shaft 35 which is geared to the main shaft 26 by means of a pair of similar spur gears 36, as clearly appears in the drawings. Also it is as well to note in this connection that the hereinbefore described smaller stirrer in the feed magazine 2 is rotated alternately in opposite directions during the operation of the machine by means of a rack 37 carried by the cross-head 29 at the front of the machine and engaging a spur gear 38 which is an idler and meshes with a spur pinion 39 fixed upon the outer end of a short rearwardly extending shaft 40 which at its rear end is geared to the stirrer shaft 8 by means of a pair of similar bevel gears 41, as is clearly shown in the drawings.

Figure 3:
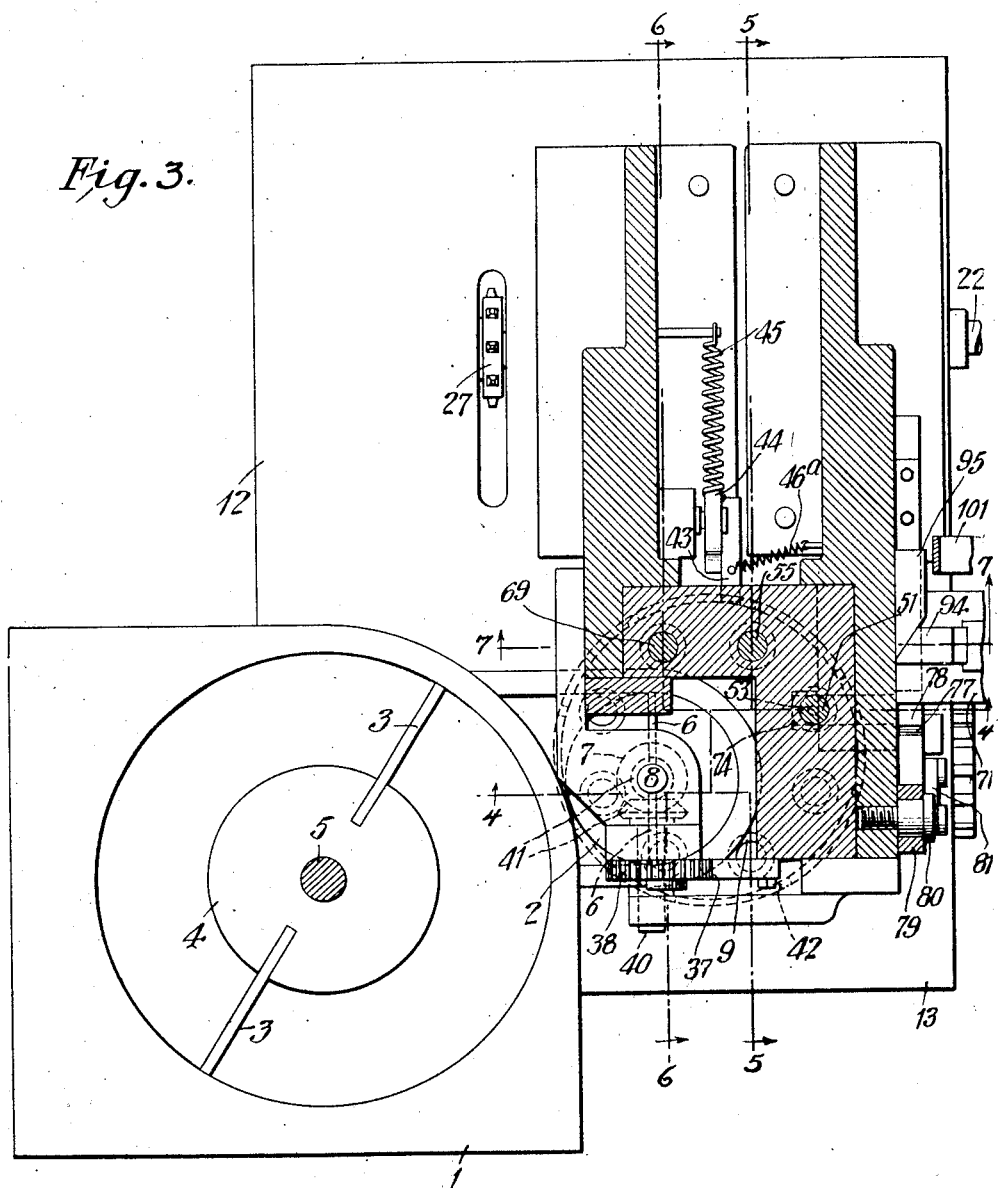
Fig. 3 is an enlarged horizontal and transverse section on a plane indicated by the line 3—3 of Fig. 2 as viewed from above, parts being omitted, and illustrating a slightly different and succeeding phase of operation in which a mold-carrying turret has reached its position of rest with the molds carried thereby in alinement with a series of plungers.

Locking means, shown as movable abutment means, are provided for preventing the continued rotation of the mold-carrying turret 10 under its own momentum after it has ceased to be actuated by the periodically acting means hereinbefore described and including the ratchet wheel 18 and its intermittently acting operating means. The mold-carrying turret 10 is shown as provided with a peripheral series of eight equidistantly spaced radially projecting abutment studs 42 corresponding to the eight equidistantly spaced molds 9 carried by this turret. At the rear of the turret 10 a forwardly extending abutment finger 43 is normally in position to engage with an abutment stud 42. This abutment finger 43 at its rear end is fixed upon the lower end of a vertically arranged pivoted actuating lever 44 to the upper arm of which is connected a retractile spring 45 for moving the abutment finger 43 to its stud-engaging position. At its upper end and at the rear the finger-actuating lever 44 is shown as slightly tapered or rounded so as to provide a cam surface which is adapted to be engaged by an actuating member 46 carried by the plunger-carrying cross-head 29 at the rear thereof, and upon the descent of the cross-head 29 this actuating member 46 operates the lever 44 to retract the abutment finger 43 out of the path of the peripherally projecting abutment studs 42. When the abutment finger 43 is retracted, a laterally extending retractile spring 46ª connected thereto and anchored to the frame of the machine operates to shift this lever to the right as viewed from the front of the machine and as seen in Fig. 3, so that when the plunger-carrying cross-head 29 descends and while the turret 10 is still stationary, the forward lug-engaging end of this abutment finger 43 will be shifted to the extent permitted by a certain amount of lost motion in the pivoted operating lever 44 sufficiently that the forward end of the abutment finger 43 under the actuation of the spring 46ª will rest upon the top of the abutment stud 42 which it before was in engagement with, thereby leaving the turret 10 free to be rotated when its operating mechanism hereinbefore described is brought into operation as provided for in the construction of the machine and whereupon the spring-pressed abutment finger 43, upon the next intermittent partial rotation of the mold-carrying turret 10 will be free to be pressed into its engaging position, by the spring 45, as will be readily understood, thereby effectively preventing the momentum of the turret 10 and its connected parts from carrying it too far.

The means for forming the loose cylindrical charges 14 contained in the molds 9 into firmly compacted bobbins having an electrode rod extending therethrough and projecting from one end thereof and including features of our present invention will now be described. The cross-head 29 rigidly carries three downwardly projecting plungers for operating upon the cylindrical charges 14 of loose depolarizing material contained in the molds 9, at the successive periods of rest of the intermittently rotated turret 10, all of these three plungers, however, being operated at once and each performing its own operation different from that of any of the other plungers and in a different mold, the molds being moved successively into alinement with the successive plungers. In the particular machine illustrated in the drawings these three plungers, which are arranged in an arcuate series, are spaced apart the same distance as the molds 9, so that as the mold-carrying turret 10 rotates in the operation of the machine the plungers will operate successively upon the charges of depolarizing material in each successive mold 9, as will be readily understood.

Figure 4:
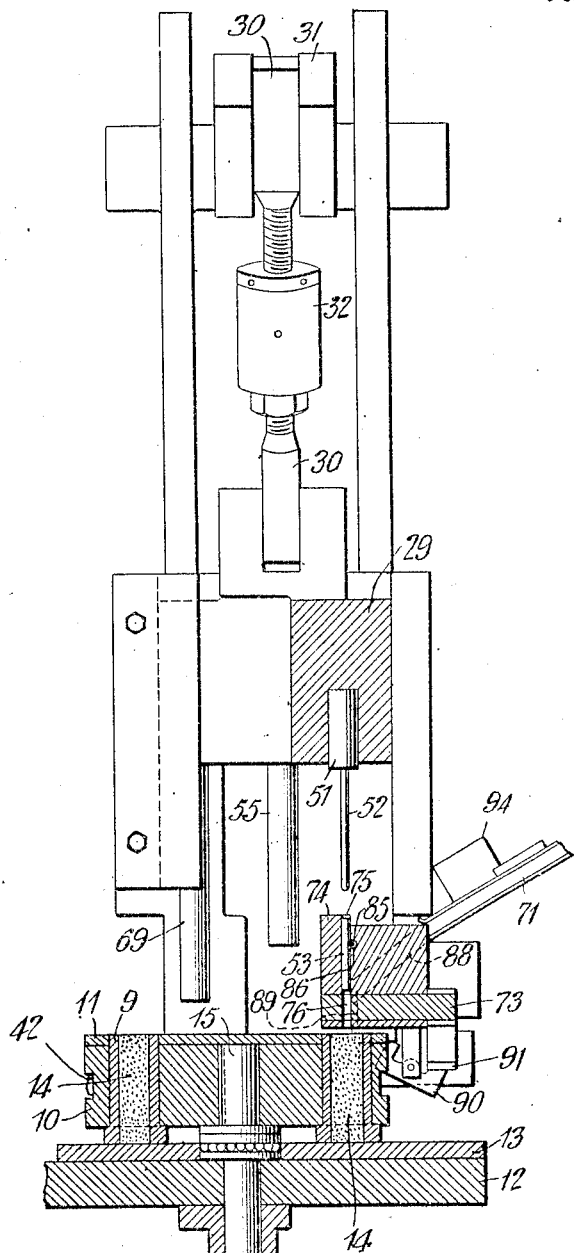
Fig. 4 is a partial vertical section on planes indicated by the offset line 4—4 of Fig. 3 as viewed from below.

The first plunger to operate is a carbon-inserting plunger for inserting a carbon electrode rod as a punch into the previously unpunched cylinder 14 of loose depolarizing material, and this plunger comprises an enlarged securing shank 51 fixed in the cross-head 29 and a downwardly projecting carbon-inserting rod 52 for pushing a carbon electrode rod 53 downward as a punch through the loose depolarizing material into the upper end of the previously unpunched cylindrical charge 14, as appears at the right in Fig. 4, this carbon electrode rod 53 having been brought into vertical position in alinement with the inserting rod 52 and with the longitudinal axis of the loose cylindrical charge 14 by means which will presently be described. In the particular machine illustrated in the drawings, the carbon electrode rod 53 is not pushed or forced as a punch all of the way through the cylindrical charge 14 by the carbon-inserting rod 52, but the proportions and extent of movement of the parts are such that this rod is forced as a punch all of the way into the charge and is pushed all of the way into the mold 9 until its upper end is level or flush therewith, and also likewise level or flush with the upper end of the charge of depolarizing material which fills the mold. However, by reason of the carbon electrode rod 53 being of less length than the mold and the charge which fills it, this carbon electrode rod 53 will be forced as a punch only part way through the cylindrical charge of depolarizing material, and will come to rest in the upper end thereof, as appears at the left in Fig. 5 and at the right in Fig. 7, illustrating the completion of the operation indicated at the right in Fig. 4 in one of the molds 9 which has been carried to the next succeeding position for an operation of the next succeeding plunger, but before this next or second operation has been performed. This employment of the carbon electrode rod 53 as a punch and its insertion into the cylindrical charge of depolarizing material without any hole or perforation having been previously formed therein forms one of the features of our present invention, differentiating from the inventions disclosed in both of our above mentioned copending applications.

The next or second plunger to act is a combined carbon-positioning and compressing plunger 55 which at its upper end is fixed in the cross-head 29 and which is cylindrical and of a size to fit snugly at its lower end within any one of the cylindrical molds 9. When the plunger-carrying cross-head 29 descends, the cylindrical plunger 55 will enter the mold 9 which is at a position of rest in alinement therewith, as appears at the left in Fig. 5 and at the right in Fig. 7 and in which this plunger is shown as having descended to a slight extent, as is indicated by the position of the crank 31 in the upper part of Fig. 5. As the cross-head 29 descends the plunger 55 will concurrently engage the outer or upper end of the carbon electrode rod 53 and come into contact with the upper end of the partly perforated cylindrical charge 55$^a$ of depolarizing material, after which the further descent of the plunger 55 not only moves the carbon rod downward as a punch through the depolarizing material but also compresses the depolarizing material in advance of the plunger 55 and around the carbon rod 53, thereby to produce a firmly compressed tube 56 of depolarizing material around the carbon rod 53, which by reason of its greater length projects downward from and beyond the lower end of this compressed tube 56, as is shown at the right in Fig. 8, and at the left in Figs. 6 and 7. It is to be noted that by the operation of the first plunger 52 a carbon electrode rod 53 is made to force its way as a punch into a charge of depolarizing material to the extent of the length of this rod, and that by the operation of the second plunger 55 the charge is concurrently compressed and the electrode rod forced as a punch through and downwardly beyond the charge until it projects from the lower end of the now completely perforated and compressed tubular charge 56, this combination of features clearly differentiating our present invention from those of our hereinbefore mentioned copending applications. In view of the fact, that the carbon electrode rod 53 is pushed in as a punch at one end of the charge of depolarizing material and out from the other end thereof, it will be readily understood that it will be impossible for any irregularity to result in the positioning of the electrode rod in the depolarizing material in the completed battery cell.

In order to provide for the reception of the downwardly projecting lower end of the carbon electrode rod 53, and for the further rotation of the mold-carrying turret 10 to the position at which the completed electrode bobbin is discharged or ejected from the mold 9, means are provided now to be described. The bed plate 12 of the machine is provided with an elongated slot 57 and immediately above the slot 57 in the bed plate 12, the overlying face plate 13 is provided with a tapered slot 58, the smaller end of which, appearing at the right in Figs. 7, 8 and 9, is just of a size to permit the free passage of the lower projecting end of the electrode rod 53, and is shown as cylindrically rounded to correspond with the circumferential curve of the cylindrical electrode rod, while the other or larger end of the slot 58, which appears at the left in Figs. 7, 8 and 9, is circularly curved and is of sufficient width for the free passage of the completed electrode bobbin including the tube 56 thereof, for thereby permitting the discharge of the completed electrode bobbins from the molds 9 in the ejecting operation performed by the third and last plunger, as will presently appear.

It will be noted that in the preceding or first operation, the face plate 13 forms an imperforate bottom for the successive molds 9, the first operation referred to being the insertion or forcing into the previously unpunched depolarizing material of the carbon electrode rod 53 as a punch by the first plunger having the carbon-inserting rod 52. It is now to be noted that at the second operation just described of forcing the carbon electrode rod 53 as a punch the rest of the way through and beyond the charge 55$^a$ and at the same time compressing this charge 55$^a$ to form the bobbin tube 56, the face plate 13, at this position of the molds 9 in alinement with the second plunger 55, forms a partial bottom for the molds 9, and supports the charge 55$^a$ during the forcing through as a punch of the electrode rod 53 and the compression of this charge, excepting in the space occupied by the smaller end of the tapered slot 58, and movable abutment means now to be described are provided for intermittently closing the smaller end of this slot beneath the charge 55$^a$ of depolarizing material and leaving only an opening or hole at the smaller end of the slot 58 for the downward passage of the lower end of the electrode rod 53.

A movable abutment member 59 is shaped in tapered form at its upper end for closing the smaller end of the tapered slot 58, excepting to leave a hole in the end of this slot for the passage of the carbon electrode rod 53, and this movable abutment 59 is carried by a laterally extending lever arm 60 shown as formed in one piece or integral therewith and pivoted to the frame of the machine at the lower side of the bed plate 12 on a pivot pin 61, as appears most clearly in Figs. 7 and 8. In its upper or elevated position, the abutment 59 coöperates with the face plate 13 to form a complete bottom for the mold 9 beneath the combined carbon-positioning and compressing second plunger 55, as appears at the right in Fig. 8 and in Fig. 9, leaving only, as above described, an opening for the downwardly projecting rod 53. In its lowered position appearing in the other figures of the drawings, particularly in Figs. 2 and 7, the abutment member 59 has moved downward entirely clear of or out of the tapered slot 58 so as to provide for the lateral movement of the downwardly projecting end of the electrode rod 53 along the slots 58 toward the larger end thereof as the turret 10 rotates. The abutment member 59 together with its lever 60 is adapted to be moved to its lower or non-operative position by means of gravity assisted by the downward pull of a retractile spring 62, appearing in Fig. 2, which is attached to the lever 60 and is anchored to a pin 63 projecting from a part of the frame of the machine.

The abutment member 59 is adapted to be operated in proper timed relation from the cam shaft 22 by means of a lifter cam 64 thereon shown as of generally sector shape (see Fig. 2) which engages a cam roller 65 carried by a lifter arm 66 which is pivoted at its rear end at 67 (see Fig. 2) to the frame of the machine, and extends forward beneath and in engagement with the abutment-carrying lever 60. The shape or contour of the abutment-operating cam 64 is such, as appears in the drawings, that the abutment member 59 will be raised and will then be held or sustained in this raised slot-closing bottom-forming position appearing in Figs. 8 and 9 for a sufficient length of time during a position of rest of the mold-carrying turret 10 for the operation of the second plunger 55, as hereinbefore described, and the shape of this cam 64 is also such as to maintain the abutment member 59 in a depressed position with the slot 58 open, as appears in the drawings, particularly in Fig. 7, during the movement of the mold-carrying turret 10, so as to permit a mold 9 having an electrode rod 53 projecting downward therefrom to move away from its position in alinement with the second plunger 55, after the operation of this plunger as above described. In view of the fact, as hereinbefore noted, that the plungers are spaced apart the same distance as the spacing of the molds 9, it will require only a single movement of the turret 10 in order to bring the mold 9 from its position in alinement with the second plunger 55 at the smaller end of the slot 58 to the position in alinement with the next or third plunger at the larger end of the tapered slot 58.

The condition of the uncompleted bobbin after the operation of the first or carbon-inserting plunger and before the operation of the second or compressing plunger 55, appears at the left in Fig. 5 and at the right in Fig. 7 and after the operation of the second plunger 55 the bobbin is then complete in the mold 9, as appears at the right in Fig. 8 and at the left in Figs. 6 and 7.

The third and last plunger to operate in the molds 9 is an ejecting plunger 69 for discharging the completed electrode bobbins from the molds, and this plunger has its upper end fixed in the plunger-carrying cross-head 29, and is correspondingly longer than and projects below the carbon-positioning and compressing plunger 55, the plunger 69 being shown in the drawings as of a length adapting it to move downward from a position above a mold 9 in alinement therewith until the lower end of the plunger 69 is flush with the lower end of the mold 9, as appears at the left in Fig. 8. The larger end of the tapered slot 58 in the face plate 13 is at all times left freely open, and as the ejecting plunger 69 moves downward from the position above and in alinement with the mold 9, which contains a completed electrode bobbin, as appears in the drawings, particularly at the left in Figs. 6 and 7, to the position appearing at the left of Fig. 8, the completed bobbin which appears in the mold 9 at the left of Figs. 6 and 7 will be ejected or pushed downward out of the mold through the larger end of the tapered slot 58, and through the elongated slot 57, and will drop freely downward where it may be caught in the hand or may be received by any means provided for the purpose.

The means by which the carbon electrode rods 53 are supplied and are successively brought into alinement with the carbon-inserting plunger rod 52 will now be described. The carbon electrode rods 53 are contained in a magazine 70 and descend therefrom in horizontal position through an inclined chute 71 into which the electrode rods 53 may freely enter successively one after the other at the upper end thereof from the rod-containing magazine 70. A slotted block 72 forms a continuation of the lower end of the chute 71, and a rock shaft 73 is journaled in the lower and forward part of the slotted block 72 and at its inner end, appearing at the left in Figs. 1, 3, and 4, has fixed thereon a carbon-alining or carbon-positioning rock-arm 74 provided in one side with a longitudinal carbon-receiving groove 75, and this grooved face of the rock-arm 74 is adapted to move in contact with a smooth flat inner vertical face of the slotted block 72. The rock shaft 73 is provided with an aperture 76 in alinement with the carbon-receiving groove 75 of the rock-arm 74, as clearly appears in the drawings, particularly in Fig. 4 thereof. The groove 75 in the rock-arm 74 is of a depth completely to receive one of the carbon electrode rods 53 therein, and in the normal or horizontal position of the carbon-positioning rock-arm 74, this groove 75 registers with the lower end of the inclined slot in the slotted block 72 in position to receive the foremost of a series of the carbon rods 53 which move downward by gravity through the chute 71 and slotted block 72 forming a continuation of the lower end of the chute, this horizontal carbon-receiving position of the rock-arm 74 appearing in the drawings in Fig. 1, and this being the position of the parts of the machine appearing in Fig. 2 also.

Figure 2:
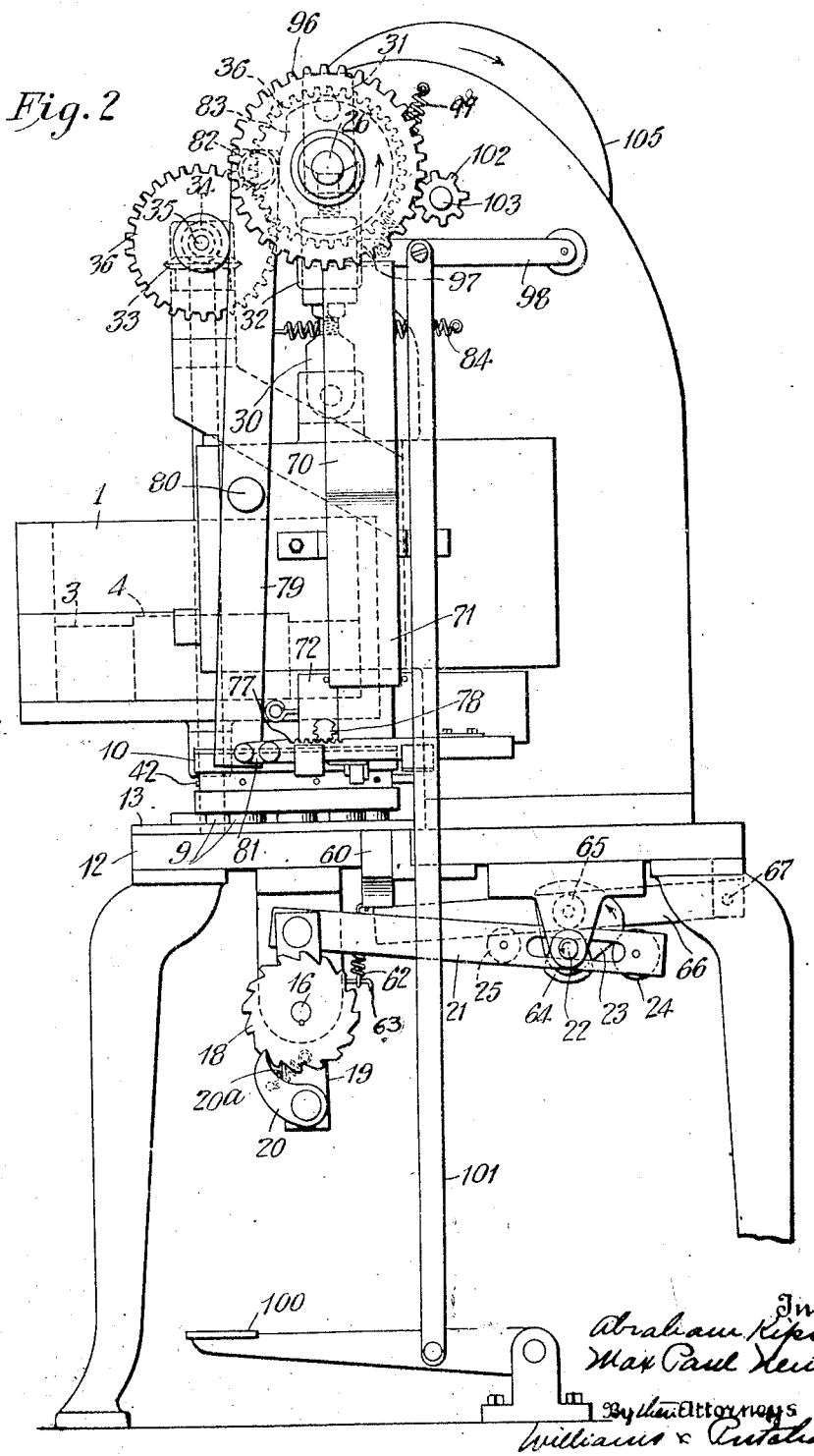
Fig. 2 is a side elevation as viewed from the right in Fig. 1 and with parts omitted.

The rock shaft 73 which carries the rock-arm 74 is adapted to be rotated through a quarter turn for thereby bringing the carbon rod 53 carried by the rock-arm 74 in the groove 75 thereof into a vertical position in alinement with the carbon-inserting plunger rod 52, and also into alinement with the axis or center line of the loose cylindrical charge 14 in the mold 9 at the corresponding position, by means of a rack bar 77 slidable in guideways provided at the side of the machine and engageable with pinion teeth 78 formed upon the outer end of the rock shaft 73, as more particularly appears in Fig. 2 of the drawings. Sliding movement is imparted to the rack 77 by means of a vertically arranged operating lever 79 pivoted on the frame of the machine by a pivot stud 80. At its lower end the lever 79 is connected to the forward end of the rack 77 by means of a short link 81, and the upper free end of this lever 79 carries a cam roller 82 which is engaged by an operating cam 83 fixed upon the adjacent end of the crankshaft 26, this cam 83 being so strapped as properly to operate the rock-arm 74 for bringing the carbon electrode rod 53 into alinement with and beneath the elevated carbon-inserting plunger 52 in proper timed relation in the operation of the machine, as will be readily understood. After the alined carbon electrode rod 53 carried in the groove 75 of the rock-arm 74 has been pushed downward by the descending carbon-inserting plunger 52 through the aperture or transverse hole 76 in the rock-shaft 73 and as a punch into the upper end of the loose cylindrical and until now unpunched charge 14, from the position of this rod appearing at the right in Fig. 4 to the position thereof appearing at the left in Fig. 5 and at the right in Fig. 7, then the carbon-positioning rock-arm 74 is returned from its vertical to its horizontal carbon-receiving position by means of a coiled retractile spring 84 attached to the upper arm of the vertically arranged lever 79 and anchored to the frame of the machine, as appears in the drawings in Figs. 1 and 2. For holding the carbon rod 53 in position in the groove 75 of the rock-arm 74, an arcuate spring wire 85 is contained in a groove 86 in the adjacent flat face of the slotted block 72 and is anchored at its ends thereto, and exerts a slight pressure on the carbon rod 53 carried by the rock-arm 74, this wire 85 appearing most clearly in Fig. 5. A stop pin or abutment stud 87 is shown as provided on the flat lateral face of the slotted block 72 for assuring that the carbon-carrying rock-arm 74 shall stop at the correct vertical position with the carbon rod 53 carried thereby in alinement with the carbon-inserting plunger rod 52.

In order to prevent the carbon electrode rod 53 from escaping from the lower end of the inclined slot 88 in the slotted block 72 during the vertical or elevated position of the rock-arm 74, a gate member 89 is provided for the lower end of this slot 88, and at the proper time is raised sufficiently to prevent the escape of the carbon electrode rods 53 by means of a short rocking lever 90 which at its inner end engages beneath a lateral angularly extending part of the gate 89, as appears most clearly in Fig. 4 and which at its outer end is adapted to be engaged and operated by a cam member 91 carried by the slidable rack 77, as appears most clearly perhaps in Fig. 4 of the drawings. When the outer end of the operating lever 90 is released by this cam member 91, the gate 89 will move downward by reason of gravity and also by reason of downward movement which will be imparted thereto through a projecting stud 92 which will be ...ged by the descending rock-arm 74, and which also serves as an abutment or stop for this rock-arm in its lowered carbon-receiving position.

To prevent the possible clogging of the carbon electrode rods 53 within the magazine 70 at the upper end of the chute 71, a slidable agitating bar 93 is arranged along the upper inclined surface of the chute 71 and projects at its upper end into the lower part of the magazine 70, and at its lower end the bar 93 carries a cam member 94 having an inclined operating face which is adapted to be engaged by the correspondingly inclined operating face of a cam member 95 mounted upon the rack 77, as shown in the drawings, particularly in Fig. 3.

The means for applying power to the machine for driving it will now be described. A spur driving gear 96 is loosely mounted upon the projecting outer end of the crank shaft 26, appearing at the right in Fig. 1 and at the front in Fig. 2, and is adapted to be rotatively connected to or coupled to the crank shaft 26 by means of a suitable clutch which may be a usual one-revolution clutch and that being the kind of clutch employed in the machine illustrated in the drawings, and having a vertically movable clutch-controlling member 97 shown as carried by the forward end of a pivoted lever 98 which at its rear end is pivoted upon the frame of the machine and which is adapted to be raised to clutch-disengaging position by means of a coiled retractile spring 99 attached thereto and shown as anchored to the frame of the machine near the top thereof, as appears in Figs. 1 and 2 of the drawings. The clutch-controlling member 97 is adapted to be depressed for connecting or coupling the driving gear 96 to the crank-shaft 26 by means of a pedal 100 connected to the controlling lever 98 by means of a long link 101.

The spur driving gear 96 is rotated by means of a spur pinion 102 meshing therewith and carried by the adjacent end of a transverse power shaft 103 journaled in the upper part of the frame of the machine at the rear and slightly below the crank-shaft 26 and provided at its other end, appearing at the left in Fig. 1, with a belt-receiving driving pulley 104 having thereon a projecting rim 105 forming a fly-wheel.

It is obvious that various modifications may be made in the construction shown in the drawings and above particularly described within the principle and scope of our invention.

We claim:

1. A bobbin making machine comprising a mold, means for supplying depolarizing material to the mold to form an unpunched charge therein, means for forcing an electrode rod as a punch part way through the previously unpunched charge of depolarizing material, means for compressing the depolarizing material and forcing said electrode rod as a punch the rest of the way through such material until its opposite end projects therefrom, and means for discharging the completed bobbin from the mold.

2. A bobbin making machine having, in combination, a series of similar molds, a series of three dissimilar plungers, means for bringing the different molds and plungers into successive alinement, means for supplying depolarizing material to the successive molds to form an unpunched charge in each mold, and means for producing relative movement of the alined molds and plungers for causing the plungers to operate upon the material in the molds; the first of said plungers being adapted to force an electrode rod as a punch into the previously unpunched charge of depolarizing material in the mold, the second of said plungers being adapted to push the electrode rod along in the charge of depolarizing material until it projects from the opposite end thereof and to compress the charge of depolarizing material around the electrode rod to a predetermined length, and the third of said plungers being an ejecting plunger for discharging the completed bobbin from the mold.

3. A bobbin making machine having, in combination, a mold, means for forming in the mold an unpunched charge of depolarizing material, means for forcing an electrode rod as a punch into the previously unpunched charge of depolarizing material in the mold, means for further pushing the electrode rod along in said charge until it projects from the opposite end thereof, and means for discharging the completed bobbin from the mold.

4. The invention claimed in claim 3 in which the means for further pushing the electrode rod along in the charge in the mold includes means for compressing the depolarizing material around the electrode rod.

5. A bobbin making machine having, in combination, a mold, means for supplying depolarizing material to the mold to form an unpunched charge therein, means for forcing an electrode rod as a punch longitudinally through said previously unpunched charge of depolarizing material in the mold until it projects from the opposite end thereof, and means for discharging the completed bobbin from the mold.

6. A bobbin making machine having, in combination, a mold, means for supplying depolarizing material to the mold to form an unpunched charge therein, a plunger for forcing an electrode rod as a punch longitudinally into such previously unpunched charge in the mold, and a plunger for pushing the electrode rod along in such charge until it projects beyond the opposite end of the charge in the mold.

7. The invention claimed in claim 6 in which the second plunger also compresses the charge of depolarizing material in the mold around the electrode rod.

8. The invention claimed in claim 6 in combination with an automatically moving movable backing member which supports the charge of depolarizing material while the electrode rod is pushed along therein so as to project therefrom at the opposite end thereof.

9. The invention claimed in claim 7 in combination with an automatically moving movable backing member which supports the depolarizing material while it is compressed around the electrode rod and providing for the movement of the electrode rod to the projecting position.

10. A machine for making bobbins for electric batteries of the kind in which a rotating turret carries a series of molds containing depolarizing material which is acted upon by a series of plungers for forming an electrode bobbin in which an electrode rod projects from one end of a cylindrical mass of depolarizing material, characterized by the fact that these plungers force the electrode rod as a punch through the mold and through the previously unpunched material contained therein until it projects from the other end thereof and from the corresponding end of the then perforated material contained in the mold, in combination with an abutment member forming a bottom for the successive molds and provided with a slot for receiving the projecting end of the electrode rod, and a movable bottom-forming abutment member for closing said slot at the side of said projecting electrode rod and movable out of said slot to provide for the passage of said projecting end of the electrode rod as the mold-carrying turret rotates.

11. An automatic machine for making bobbins for electric batteries of the kind in which a series of plungers are automatically reciprocated for acting upon depolarizing material contained in a series of molds carried by a relatively rotating mold-carrying turret for forming such depolarizing material into a cylinder having an electrode rod projecting from one end thereof, characterized by the fact that a first plunger forces an electrode rod as a punch into such previously unpunched material in the mold, a second plunger pushes this electrode rod along in the mold and along in the previously unpunched material contained therein until the end of said electrode rod projects from the other end of the mold and of the material contained therein, and a third plunger for ejecting the completed bobbin from the mold.

12. The invention claimed in claim 11 in which a backing plate provides a closure for the bottoms of the molds and has therein a tapered slot for the projection and transverse passage of the projecting end of the electrode rod, and a movable abutment member which operates automatically for partly closing the smaller end of said slot when the electrode rod is pushed to the projecting position and moves out of said slot for the transverse passage of said projecting electrode rod.

13. The invention claimed in claim 11 in which the said second plunger also compresses the depolarizing material in the mold around said electrode rod.

14. The invention claimed in claim 13 in combination with an automatically acting abutment member for partly closing said slot in the backing plate during the compression of the depolarizing material therein and movable out of said slot for permitting the transverse passage of the projecting end of the electrode rod as the turret rotates relatively to said bottom-forming backing plate.

15. A bobbin making machine comprising a mold, means for supplying depolarizing material to the mold to form an unpunched charge therein, means for forcing an electrode rod as a punch into the previously unpunched charge of depolarizing material in the mold, means for compressing the depolarizing material around the electrode rod, and means for discharging the completed bobbin from the mold.

16. A bobbin making machine comprising a mold, means for supplying depolarizing material to the mold to form an unpunched charge therein, a plunger for forcing an electrode rod into the previously unpunched charge of depolarizing material in the mold, and a compressing plunger for compressing the depolarizing material around the electrode rod to a predetermined length.

17. A bobbin making machine having, in combination, a mold, means for forming an unpunched charge of depolarizing material in the mold, a plunger for forcing an electrode rod as a punch part way through said previously unpunched charge in the mold, and a plunger for concurrently forcing the electrode rod as a punch the rest of the way through the charge of depolarizing material until it projects from the opposite end thereof and for compressing the depolarizing material around the electrode rod to a predetermined length.

18. The invention claimed in claim 2 in which the first of said plungers is adapted to force said electrode rod as a punch part way only through the previously unpunched charge of depolarizing material in the mold, and in which the second of said plungers is adapted to force said electrode rod as a punch the rest of the way through the charge of depolarizing material in the mold.

19. A bobbin making machine having, in combination, a mold, means for forming in the mold an unpunched charge of depolarizing material, means for forcing an electrode rod as a punch part way through the previously unpunched charge of depolarizing material in the mold, means for forcing the electrode rod as a puuch the rest of the way through said charge and to a position in which it projects from the opposite end from which it entered the charge, and means for discharging the completed bobbin from the mold.

20. The invention claimed in claim 19 in which the means for forcing the electrode rod as a punch the rest of the way through the charge in the mold includes means for compressing the depolarizing material around the electrode rod.

21. A bobbin making machine comprising a rotative mold-carrying turret, means for forming unpunched charges of depolarizing material in the molds, a backing plate forminn bottoms for the molds, means for forcing an electrode rod as a punch through the previously unpunched charge of depolarizing material in the mold from end to end until it projects beyond the bottom-forming surface of the backing plate, a tapered slot being provided in said backing plate and the smaller end of this slot being adapted to receive the projecting end of the electrode rod and providing for the transverse movement of the electrode rod during the rotation of the turret, a movable bottom-forming abutment member for closing the narrow part of said slot at the side of the projecting electrode rod and thereby supporting the depolarizing material during the forcing through it of the electrode rod as a punch and adapted to move out of said slot to provide a passageway for the projecting end of the electrode rod in its transverse movement during the rotation of the turret, and ejecting means for discharging the completed bobbin from the mold through the larger end of the tapered slot in the bottom-forming backing plate.

In testimony whereof, we have affixed our signatures to this specification.

ABRAHAM KIPNISS.
MAX PAUL NEUMANN.